United States Patent [19]
Jang

[11] Patent Number: 6,139,469
[45] Date of Patent: Oct. 31, 2000

[54] HYDRAULIC CONTROL SYSTEM FOR AUTOMATIC TRANSMISSION USED IN VEHICLE

[75] Inventor: Jae-Duk Jang, Yongin, Rep. of Korea

[73] Assignee: Hyundai Motor Company, Seoul, Rep. of Korea

[21] Appl. No.: 09/364,262

[22] Filed: Jul. 30, 1999

[30] Foreign Application Priority Data

Sep. 11, 1998 [KR] Rep. of Korea ............. 98-37554

[51] Int. Cl.[7] .................................... F16H 61/26
[52] U.S. Cl. ................................ 477/130; 477/158
[58] Field of Search ............................ 477/117, 130, 477/131, 158

[56] References Cited

U.S. PATENT DOCUMENTS

| | | | |
|---|---|---|---|
| 5,536,216 | 7/1996 | Jang | 475/123 |
| 5,540,634 | 7/1996 | Jang et al. | 477/131 |
| 5,565,000 | 10/1996 | Jang | 477/130 |
| 5,569,116 | 10/1996 | Jang | 477/130 |
| 5,651,751 | 7/1997 | Jang | 477/131 X |
| 5,658,218 | 8/1997 | Jang et al. | 477/130 X |
| 5,658,220 | 8/1997 | Jang | 477/130 |

*Primary Examiner*—Charles A Marmor
*Assistant Examiner*—Ha Ho

[57] ABSTRACT

A hydraulic control system includes a pressure regulator for controlling hydraulic pressure generated by an oil pump, the pressure regulator being realized through a pressure regulator valve; a pressure reducer realized through a reducing valve for maintaining pressure at a level lower than line pressure; a damper clutch controller for operating a damper clutch of a torque converter; a shift controller for forming shift modes, the shift controller being realized through a manual valve indexed with a select lever operated by a user; a hydraulic pressure controller for providing shift quality and shift responsiveness to enable smooth shifting; and a hydraulic pressure distributor for supplying suitable hydraulic pressures to first, second, third, fourth and fifth friction elements operating as input and reaction elements in each shift stage, the hydraulic pressure distributor being realized through a plurality of spool valves.

20 Claims, 11 Drawing Sheets

HYDRAULIC CONTROL SYSTEM FOR AUTOMATIC TRANSMISSION USED IN VEHICLE

BACKGROUND OF THE INVENTION (a) Field of the Invention

The present invention relates to a hydraulic control system for automatic transmissions used in vehicles.

(b) Description of the Related Art

Conventional automatic transmissions used in vehicles include a torque converter, a multi-stage gear shift mechanism connected to the torque converter, and a plurality of friction members actuated by hydraulic pressure for selecting one of the gear stages of the gear shift mechanism, the gear shift mechanism being realized through a planetary gearset. The friction elements are controlled to engaged and disengaged states by a hydraulic control system, which controls pressure generated in an oil pump, to change shift ratios of the planetary gearset.

The friction elements are selectively operated by a plurality of valves, which undergo port conversion to change the flow of hydraulic pressure, and actuators supplying hydraulic pressure to the valves. Further, a manual valve, indexed with a driver-operated shift selector to realize port conversion, is connected to a plurality of lines to supply hydraulic pressure from the oil pump to each valve and actuator.

Korean Patent No. 97-25542 (Jun. 18, 1997), filed the present applicant, discloses such a hydraulic control system. However, in this application, to realize four forward shift ranges and one reverse shift range, four large-capacity solenoid valves, and a pressure control valve for controlling the solenoid valves, are used as a hydraulic pressure distributor. However, these solenoid valves are excessively large, and a valve body of the solenoid valves has an internal line structure that is complicated. Further, since a line pressure is controlled only by a drive pressure when driving in forward speeds, and a reverse pressure when driving in reverse, there occurs drive loss of the hydraulic pump during high-speed driving. This also results in a higher level of fuel consumption.

SUMMARY OF THE INVENTION

The present invention has been made in an effort to solve the above problems.

It is an object of the present invention to provide a hydraulic control system in which each friction element can be independently controlled using three solenoid valves.

It is another object of the present invention to provide a hydraulic control system in which a structure of lines in valve bodies of the solenoid valves is simple.

To achieve the above objects, the present invention provides a hydraulic control system including pressure regulating means for controlling hydraulic pressure generated by an oil pump, the pressure regulating means being realized through a pressure regulator valve; pressure reducing means realized through a reducing valve for maintaining pressure at a level lower than line pressure; damper clutch control means for operating a damper clutch of a torque converter; shift control means for forming shift modes, the shift control means being realized through a manual valve indexed with a select lever operated by a user; hydraulic pressure control means for providing shift quality and shift responsiveness to enable smooth shifting; and hydraulic pressure distribution means for supplying suitable hydraulic pressures to first, second, third, fourth and fifth friction elements operating as input and reaction elements in each shift stage, the hydraulic pressure distribution means being realized through a plurality of spool valves, The hydraulic pressure control means includes (a) first pressure control valve means for controlling the hydraulic pressure supplied to the first friction element, (b) second pressure control valve means for controlling the hydraulic pressure supplied to the second friction element, (c) third pressure control valve means for controlling the hydraulic pressure supplied to the third friction element, and (d) an N-R control valve which controls reverse pressure supplied to the fourth friction element.

The hydraulic pressure distribution means includes (a) a switch valve supplying a part of operational pressure of a third operational element to the pressure regulator valve for line pressure control, the third operational element operating in a third and fourth speed of a drive D range while being controlled by forward pressure supplied from the manual valve; (b) a first fail-safe valve controlled by part of the hydraulic pressure supplied to the first, third and fifth friction elements and control pressure supplied from the manual valve in the drive D range, and which supplies hydraulic pressure the second friction elements in a second and fourth speed of the drive D range or exhausts the hydraulic pressure supplied to the second friction element when a transmission control unit is malfunctioning; (c) a second fail-safe valve controlled by control pressure supplied from the second pressure control valve means and hydraulic pressure supplied from the manual valve via a low control valve in a low L range, and which supplies hydraulic pressure supplied to the third pressure control valve means to the third friction element in the third and fourth speeds of the drive D range and to the fourth friction element in the low L range, and supplies reverse pressure supplied through a reverse pressure line to the fourth friction element in a reverse R range; and (d) a low control valve controlled by the hydraulic pressure supplied to the third friction element, and which controls the hydraulic pressure supplied to the second fail-safe valve from the manual valve in the low L range.

Accumulators are provided on lines connected to the first, second and third friction elements, which operate in forward driving modes, the accumulators storing fluid during the supply of hydraulic pressure such that hydraulic pressure flows smoothly.

According to a feature of the present invention, the manual valve of the shift control means forms passages for control of line pressure and supply of hydraulic pressure to the fourth and fifth friction elements in the reverse R range, supply of hydraulic pressure to the hydraulic pressure control means and the hydraulic pressure distribution means in the drive D range, supply of control pressure to the second fail-safe valve via the low control valve of the hydraulic pressure distribution means in the low L range.

According to another feature of the present invention, the first pressure control valve means comprises a first pressure control valve and a first solenoid valve for controlling the hydraulic pressure supplied to the first friction element in a first and the second and third speeds of the drive D range; the second pressure control valve means comprises a second pressure control valve and a second solenoid valve for supplying hydraulic pressure to the second friction element in the second and fourth speeds of the drive D range; and the third pressure control valve means comprises a third pressure control valve and a third solenoid valve for supplying hydraulic pressure to the third friction element in the third and fourth speeds of the drive D range.

According to still another feature of the present invention, the hydraulic pressure controlled in the first pressure control valve means of the hydraulic pressure control means is supplied to the first friction element which operates in first, second and third speeds of the drive D range, and to the first fail-safe valve as control pressure.

According to still another feature of the present invention, the hydraulic pressure controlled in the second pressure control valve means of the hydraulic pressure control means is supplied as control pressure to the second fail-safe valve, and via the first fail-safe valve to the second friction element which operates in the second and fourth speeds of the drive D range.

According to still yet another feature of the present invention, the hydraulic pressure controlled in the third pressure control valve means of the hydraulic pressure control means is supplied as control pressure to the first failsafe valve, and to the third friction element via the second fail-safe valve in the third and fourth speeds of the drive D range.

According to still yet another feature of the present invention, the N-R control valve of the hydraulic pressure control means is controlled by hydraulic pressure supplied from the second pressure control valve means in the reverse R range, and which receives part of the hydraulic pressure supplied from the manual valve to the fifth friction element via a first reverse pressure line and supplied the hydraulic pressure to the fourth friction element and the first fail-safe valve via a second reverse pressure line and the second fail-safe valve.

According to still yet another feature of the present invention, check valves are disposed between lines supplying hydraulic pressure to the first, second and third pressure control valve means and the N-R control valve and lines supplying pressure controlled in the first, second and third pressure control valve means and the N-R control valve to other elements of the hydraulic control system, the check valves acting to prevent reverse flow of hydraulic pressure.

According to still yet another feature of the present invention, lines are formed to allow the hydraulic pressure supplied to the third friction element to be supplied to the pressure regulator valve via the switch valve, and as control pressure to the low control valve.

According to still yet another feature of the present invention, a valve body of the first pressure control valve includes a first port receiving reduced hydraulic pressure from the reducing valve; a second port receiving hydraulic pressure from the manual valve; a third port for supplying the hydraulic pressure supplied to the second port to an underdrive clutch of the first friction element; and a fourth port receiving control pressure from the first solenoid valve, a valve spool in the valve body of the first pressure control valve includes a first land having a small diameter for selectively exhausting the hydraulic pressure supplied to the first port through an exhaust port; a second land on which the hydraulic pressure supplied to the first port acts to selectively open/close the second port; and a third land for selectively communicating the second and third ports together with the second land, and an elastic member is interposed between the third land and one end of the valve body.

According to still yet another feature of the present invention, a valve body of the second pressure control valve includes a first port receiving reduced hydraulic pressure from the reducing valve, a second port receiving hydraulic pressure from the manual valve, a third port for supplying the hydraulic pressure supplied to the second port to the first and second fail-safe valves, and a fourth port receiving control pressure from the second solenoid valve, a valve spool in the valve body of the second pressure control valve includes a first land having a small diameter for selectively exhausting the hydraulic pressure supplied to the first port through an exhaust port, a second land on which the hydraulic pressure supplied to the first port acts to selectively open/close the second port, and a third land for selectively communicating the second and third ports together with the second land, and an elastic member is interposed between the third land and one end of the valve body.

According to still yet another feature of the present invention, a valve body of the third pressure control valve includes a first port receiving reduced hydraulic pressure from the reducing valve, a second port receiving hydraulic pressure from the manual valve, a third port for supplying the hydraulic pressure supplied to the second port to the first and second fail-safe valves, and a fourth port receiving control pressure from the third solenoid valve, a valve spool in the valve body of the third pressure control valve includes a first land having a small diameter for selectively exhausting the hydraulic pressure supplied to the first port through an exhaust port, a second land on which the hydraulic pressure supplied to the first port acts to selectively open/close the second port, and a third land for selectively communicating the second and third ports with the second land, and an elastic member is interposed between the third land and one end of the valve body.

According to still yet another feature of the present invention, a valve body of the N-R control valve, controlled by control pressure of the second solenoid valve, includes a first port receiving control pressure of the second solenoid valve, a second port receiving hydraulic pressure from the manual valve, and a third port for supplying the hydraulic pressure supplied to the second port to the second fail-safe valve, a valve spool in the valve body of the N-R control valve includes a first land on which the hydraulic pressure supplied through the first port acts, and a second land for selectively communicating the second and third ports, and an elastic member is interposed between the second land and one end of the valve body.

According to still yet another feature of the present invention, a valve body of the switch valve includes a first port receiving forward driving pressure from the manual valve, and second and third ports receiving part of the pressure supplied to the third friction element and supplying this hydraulic pressure to the pressure regulator valve, and a valve spool in the valve body of the switch valve includes a first land on which the hydraulic pressure supplied through the first port acts; a second land formed on an end of the valve spool opposite that on which the first land is formed, the second land selectively communicating the second and third ports; and a third land formed between the first and second lands and which selectively communicates the third port with an exhaust port.

According to still yet another feature of the present invention, a valve body of the first fail-safe valve includes a first port receiving hydraulic pressure from the manual valve, a second port receiving hydraulic pressure from the second pressure control valve means, a third port receiving hydraulic pressure from the third pressure control valve means, a fourth port receiving hydraulic pressure from the first pressure control valve, a fifth port receiving hydraulic pressure from the N-R control valve, and a sixth port supplying the hydraulic pressure supplied to the second port to the second friction element, and a valve spool in the valve body of the first fail-safe valve includes a first land on which the hydraulic pressure supplied through the fourth port acts; a second land on which the hydraulic pressure supplied through the fifth port acts; a third land on which the hydraulic pressure supplied through the third port acts; fourth and fifth lands selectively communicating the second and sixth ports, and communicating the sixth port selectively to an exhaust port; and a sixth land on which the hydraulic pressure supplied through the first port acts.

According to still yet another feature of the present invention, a valve body of the second fail-safe valve includes are a first port receiving control pressure from the low control valve in the low L range, a second port receiving hydraulic pressure from the N-R control valve in the reverse R range, a third port supplying the hydraulic pressure supplied to the second port to the fourth friction element, a fourth port receiving hydraulic pressure from the third pressure control valve means, a fifth port supplying the hydraulic pressure supplied to the fourth port to the third friction element, and a sixth port receiving hydraulic pressure from the second pressure control valve, a valve spool in the valve body of the second fail-safe valve includes a first land on which the hydraulic pressure supplied through the first port acts to selectively open and close the second port, a second land for selectively communicating the fourth port with the third and fifth ports, and a third land for selectively communicating the fifth port with an exhaust port, and an elastic member is interposed between the valve body and the third land.

According to still yet another feature of the present invention, a valve body of the low control valve includes a first port receiving hydraulic pressure from the manual valve, a second port supplying the hydraulic pressure supplied to the first port to the second fail-safe valve, and a third port receiving hydraulic pressure from the fifth port of the second fail-safe valve, a valve spool in the valve body of the low control valve includes a first land on which the hydraulic pressure supplied to the third port acts to selectively open and close the first port, and a second land for selectively communicating the second port with an exhaust port, and an elastic member is interposed between the valve body and the second land.

According to still yet another feature of the present invention, a reference operational pressure of the switch valve is set at 0.8 kg/cm², and a reference operational pressure of the low control valve is set at 0.3 kg/cm².

According to still yet another feature of the present invention, during shifting from the third speed of the drive D range, the hydraulic pressure of the first friction element is increased while the hydraulic pressure of the third friction element is discontinued, and after the hydraulic pressure of the third friction element falls below a predetermined level, operational pressure is supplied to the fourth friction element as a low L pressure of the manual valve is supplied to the second fail-safe valve.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figure 1:
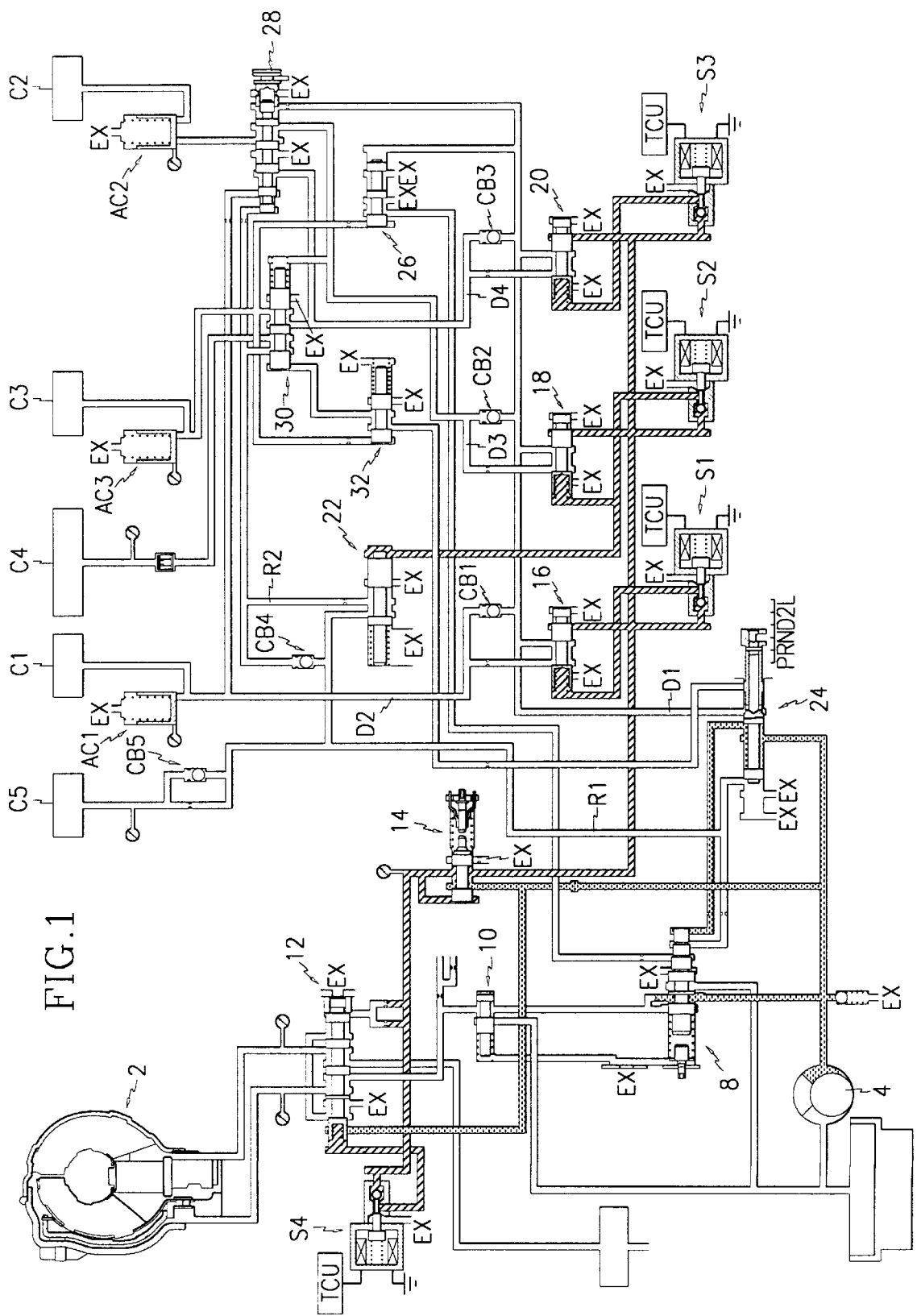
FIG. 1 is a hydraulic circuit diagram of a hydraulic control system according to a preferred embodiment of the present invention.

FIG. 1 shows a hydraulic circuit diagram of a hydraulic control system according to a preferred embodiment of the present invention. FIG. 1 illustrates hydraulic flow in a neutral N range, i.e., when a select lever is positioned at the neutral N range. The hydraulic control system of the present invention performs automatic shifting of a transmission through the utilization of a transmission control unit (TCU), which either duty-controls solenoid valves or controls the solenoid valves to ON and OFF states according to various conditions such as throttle valve opening, vehicle load, vehicle speed, etc.

In more detail, with the operation of a torque converter 2, directly connected to and driven by a crankshaft of an engine, an input shaft of the transmission is driven. At the same time, an oil pump 4, which includes a drive gear mounted to a pump drive hub of the torque converter 2 and a driven gear meshed with the drive gear, is driven to generate hydraulic flow, resulting in the generation of hydraulic pressure in the hydraulic control system. The hydraulic pressure generated by the oil pump 4 is controlled in pressure regulating means, then distributed to damper clutch control means, pressure reducing means, and shift control means.

The pressure regulating means includes a pressure regulator valve 8 for controlling the pressure received from the oil pump 4 to a predetermined level of pressure, and a torque converter control valve 10 which receives the pressure from the pressure regulator valve 8 and controls the pressure to a predetermined level suitable for the torque converter 2 and for lubrication. Connected via lines to the torque converter control valve 10 is a damper clutch control valve 12, which acts as the damper clutch control means. The damper clutch control valve 12 controls a damper clutch to improve a power transmission efficiency of the torque converter 2.

The pressure reducing means is realized through a reducing valve 14 for maintaining pressure at a level lower than line pressure. Part of the pressure reduced in the reducing valve 14 is supplied as control pressure to the damper clutch control valve 12. Further, part of the pressure reduced in the reducing valve 14 is supplied to hydraulic pressure control means. That is, part of the pressure reduced in the reducing valve 14 is supplied to first, second and third pressure control valves 16, 18 and 20 for forming hydraulic pressure for use as shift range control pressure; first, second and third solenoid valves S1, S2 and S3 which independently control the first, second and third pressure control valves 16, 18 and 20, respectively; and an N-R control valve 22 which reduces shift shock when shifting from the neutral N range to a reverse R range.

The shift control means is realized through a manual valve 24 which is indexed with the select lever to undergo port conversion, the select lever being operated by the user. In a drive D range, a manual second speed range, and a low L range, hydraulic pressure supplied to the manual valve 24 is controlled by the hydraulic pressure control means and directly or indirectly supplied to first, second, third and fourth friction elements C1, C2, C3 and C4, the hydraulic pressure being indirectly supplied via hydraulic pressure distribution means: a switch valve 26, first and second fail-safe valves 28 and 30, and a low control valve 32.

Further, in the reverse R range, the hydraulic pressure supplied to the manual valve 24 is supplied directly to a fifth friction element C5, and to the fourth friction element C4 via the N-R control valve 22 and the second fail-safe valve 30. To supply the hydraulic pressure as in the above, the first, second and third pressure control valves 16, 18 and 20; the switch valve 26; and the first fail-safe valve 28 are connected to a first line D1, the manual valve 24 being connected to and supplying forward driving pressure via the first line D1.

The hydraulic pressure controlled in the first pressure control valve 16 is supplied via a second line D2 to the first friction element C1 which operates in first, second and third speeds of the drive D range. The hydraulic pressure controlled in the first pressure control valve 16 is also supplied as control pressure to the first fail-safe valve 28.

The hydraulic pressure controlled in the second pressure control valve 18 is supplied through a third line D3 to the second friction element C2 after passing through the fail-safe valve 28, the second friction element C2 operating in the second and third speeds of the drive D range. The hydraulic pressure controlled in the second pressure control valve 18 is also supplied as control pressure to the second fail-safe valve 30.

Additionally, the hydraulic pressure controlled in the third pressure control valve 20 is selectively supplied to the third and fourth friction elements C3 and C4 via a fourth line D4 and the second fail-safe valve 30, and in a fourth and the third speed of the drive D range, the hydraulic pressure is supplied via the switch valve 26 to either the pressure regulator valve 8 or as control pressure to the low control valve 32.

The N-R control valve 22 is controlled by the hydraulic pressure supplied from the second pressure control valve 18 in the reverse R range. The N-R control valve 22 also receives part of the hydraulic pressure supplied to the fifth friction element C5 via a first reverse pressure line R1, and supplies this hydraulic pressure to the fourth friction element C4 or as control pressure to the first fail-safe valve 28 via a second reverse pressure line R2 and the second fail-safe valve 30. The switch valve 26, which is controlled by the forward driving pressure supplied from the manual valve 24, is connected to a line to supply part of the hydraulic pressure supplied to a third operational element operating in the third and fourth speeds of the drive D range such that line pressure control can be performed.

The first fail-safe valve 28 receives as control pressure part of the hydraulic pressure supplied to the first, third and fifth friction elements C1, C2 and C3, and the hydraulic pressure supplied from the manual valve 24 in the drive D range. The first fail-safe valve 28 then selectively either supplies the hydraulic pressure to the second friction element C2, or exhausts the hydraulic pressure supplied to the second friction element C2 when the TCU is malfunctioning such that the third speed is held.

The second fail-safe valve 30 is controlled by the control pressure supplied from the second pressure control valve 18, and, when in the low L range, by the hydraulic pressure supplied from the manual valve 24 via the low control valve 32. The second fail-safe valve 30 supplies the hydraulic pressure from the third pressure control valve 20 to the third friction element C3 in the third and fourth speeds of the drive D range and to the fourth friction element C4 in the low L range, and supplies the hydraulic pressure from the second reverse pressure line R2 to the fourth friction element C4 in the reverse R range. Further, the low control valve 32 is controlled by the hydraulic pressure supplied to the third friction element C3, and controls the hydraulic pressure supplied to the second fail-safe valve 30 from the manual valve 24.

A first, second, and third check valve CB1, CB2 and CB3 are provided respectively on the second, third and fourth lines D2, D3 and D4, the second, third and fourth lines D2, D3 and D4 in fluid communication with the first line D1 respectively through the first, second and third check valves CB1, CB2 and CB3. Also, a fourth check valve CB4 is provided on the second reverse pressure line R2 and the second reverse pressure line R2 is in fluid communication with the first reverse pressure line R1 through the fourth check valve CB4. Further, a fifth check valve CB5 is provided on a bypass line R1-1 of the first reverse pressure line R1.

The first, second, third, fourth and fifth check valves CB1, CB2, CB3, CB4 and CB5 prevent the reverse flow of hydraulic pressure. The fifth check valve CB5 also enables quick exhaust of operational pressure. Moreover, provided on lines connected to the first, second and third friction elements are first, second and third accumulators AC1, AC2 and AC3, respectively. The accumulators AC1, AC2 and AC3 store fluid when hydraulic pressure is supplied such that hydraulic pressure flows smoothly.

Figure 2:
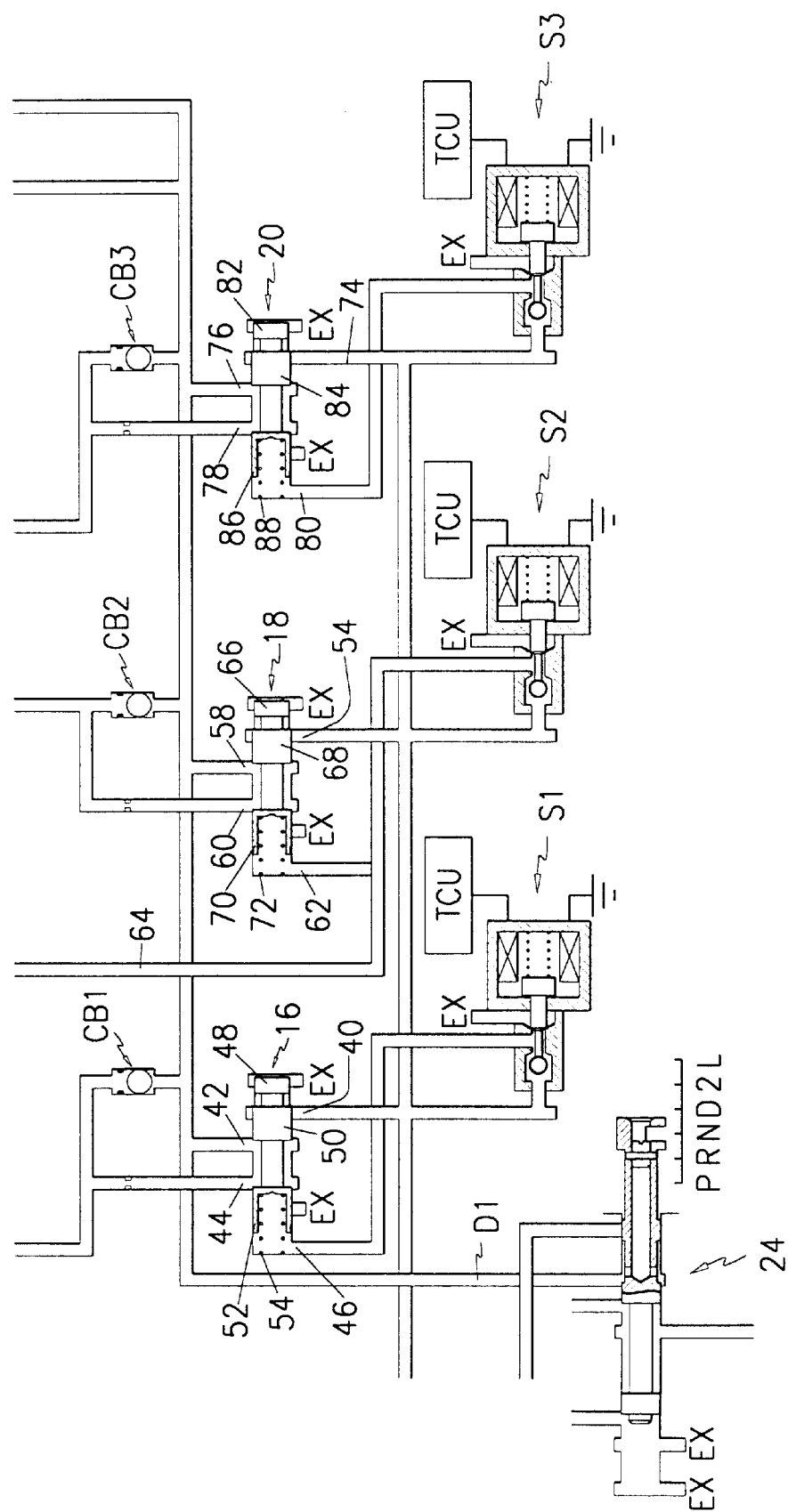
FIG. 2 shows a portion of the hydraulic circuit diagram of FIG. 1 corresponding to hydraulic pressure control means.

FIG. 2 shows a portion of the hydraulic circuit diagram of FIG. 1 corresponding to the hydraulic pressure control means. Formed on a valve body of the first pressure control valve 16 are a first port 40 receiving reduced hydraulic pressure from the reducing valve 14, a second port 42 receiving hydraulic pressure from the manual valve 24, a third port 44 for supplying the hydraulic pressure supplied to the second port 42 to an underdrive clutch of the first friction element C1, and a fourth port 46 receiving control pressure from the first solenoid valve S1.

A valve spool in the valve body of the first pressure control valve 16 includes a first land 48 having a small diameter for selectively exhausting the hydraulic pressure supplied to the first port 40 through an exhaust port EX, a second land 50 on which the hydraulic pressure supplied to the first port 40 acts to selectively open/close the second port 42, and a third land 52 for selectively communicating the second and third ports 42 and 44 together with the second land 50. Interposed between the third land 52 and one end of the valve body is an elastic member 54. The elastic member 54 exerts constant force on the valve spool in a rightward direction (in the drawing).

The first solenoid valve S1, which controls the first pressure control valve 16, is a conventional three-way valve. If the first solenoid valve S1 is controlled to ON, the hydraulic pressure supplied as control pressure to the first pressure control valve 16 is exhausted in a state where the supply of reduced pressure from the reducing valve 14 is discontinued. On the other hand, if the first solenoid valve S1 is controlled to OFF, the exhaust port EX is closed and hydraulic pressure is able to be supplied to the fourth port 46. That is, when the first solenoid valve S1 is controlled to ON, the valve spool of the first pressure control valve 16 moves to the left (in the drawing) such that the second port 42 is closed, while if the first solenoid valve S1 is controlled to OFF, the valve spool moves to the right (in the drawing) by the supply of control pressure such that the second and third ports 42 and 44 are in fluid communication, thereby supplying control pressure to the first friction element C1.

With regard to the second pressure control valve 18 and the second solenoid valve S2, the second solenoid valve S2 controlling the second pressure control valve 18, these elements are structured and operate identically to the first pressure control valve 18 and the first solenoid valve S1, respectively. However, some of the lines connected to the second pressure control valve 18 are different.

Formed on a valve body of the second pressure control valve 18 are a first port 54 receiving reduced hydraulic pressure from the reducing valve 14, a second port 58 receiving hydraulic pressure from the manual valve 24, a third port 60 for supplying the hydraulic pressure supplied to the second port 58 to the first and second fail-safe valves 28 and 30, and a fourth port 62 receiving control pressure from the second solenoid valve S2.

A valve spool in the valve body of the second pressure control valve 18 includes a first land 66 having a small diameter for selectively exhausting the hydraulic pressure supplied to the first port 54 through an exhaust port EX, a second land 68 on which the hydraulic pressure supplied to the first port 54 acts to selectively open/close the second port 58, and a third land 70 for selectively communicating the second and third ports 58 and 60 together with the second land 68. Interposed between the third land 70 and one end of the valve body is an elastic member 72. The elastic member 72 exerts constant force on the valve spool in a rightward direction (in the drawing).

If the second solenoid valve S2, which controls the second pressure control valve 18, is controlled to ON, the valve spool of the second pressure control valve 18 moves to the left (in the drawing) such that the second port 58 is closed, and if the second solenoid valve S2 is controlled to OFF, the valve spool moves to the right (in the drawing) such that the second and third ports 58 and 60 are in fluid communication. As a result of the second and third ports 58 and 60 being in fluid communication, hydraulic pressure is supplied to the first and second fail-safe valves 28 and 30.

The third pressure control valve 20 and the third solenoid valve S3, the third solenoid valve S3 controlling the second pressure control valve 18, are structured and operate identically to the first and second pressure control valves 16 and 18, and the first and second solenoid valves S1 and S2, respectively. However, some of the lines connected to the third pressure control valve 20 are different.

Formed on a valve body of the third pressure control valve 20 are a first port 74 receiving reduced hydraulic pressure from the reducing valve 14, a second port 76 receiving hydraulic pressure from the manual valve 24, a third port 78 for supplying the hydraulic pressure supplied to the second port 76 to the first and second fail-safe valves 28 and 30, and a fourth port 80 receiving control pressure from the third solenoid valve S3.

A valve spool in the valve body of the third pressure control valve 20 includes a first land 82 having a small diameter for selectively exhausting the hydraulic pressure supplied to the first port 74 through an exhaust port EX, a second land 84 on which the hydraulic pressure supplied to the first port 74 acts to selectively open/close the second port 76, and a third land 86 for selectively communicating the second and third ports 76 and 78 with the second land 84. Interposed between the third land 86 and one end of the valve body is an elastic member 88. The elastic member 88 exerts constant force on the valve spool in a rightward direction (in the drawing).

If the third solenoid valve S3, which controls the third pressure control valve 20, is controlled to ON, the valve spool of the third pressure control valve 20 moves to the left (in the drawing) such that the second port 76 is closed, and if the third solenoid valve S3 is controlled to OFF, the valve spool moves to the right (in the drawing) such that the second and third ports 76 and 78 are in fluid communication. As a result of the second and third ports 58 and 60 being in fluid communication, hydraulic pressure is supplied to the first and second failsafe valves 28 and 30.

Figure 3:
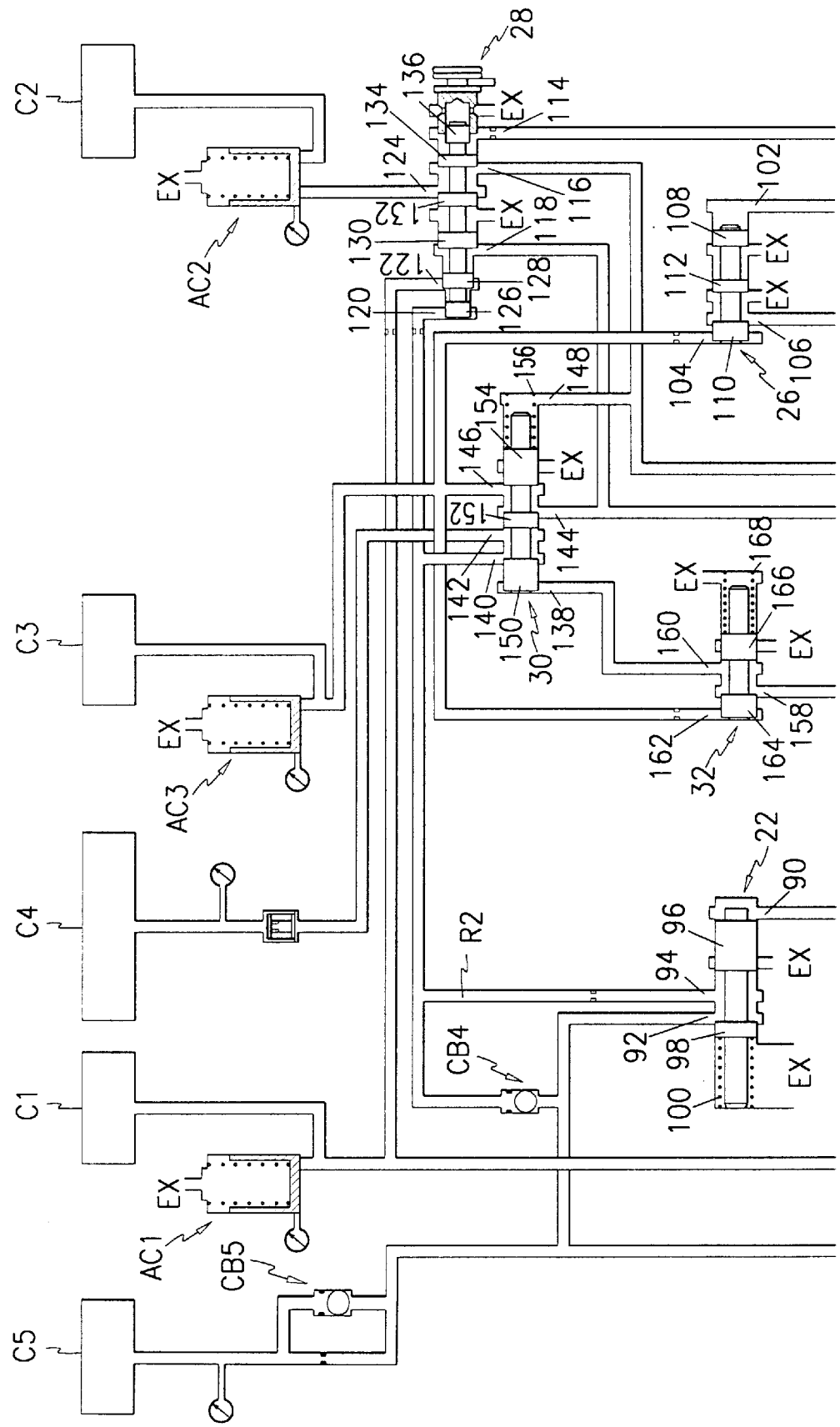
FIG. 3 shows a portion of the hydraulic circuit diagram of FIG. 1 corresponding to hydraulic pressure distribution means.

FIG. 3 shows a portion of the hydraulic circuit diagram of FIG. 1 corresponding to the hydraulic pressure distribution means. A valve body of the N-R control valve 22, controlled by control pressure of the second solenoid valve S2, includes a first port 90 receiving the control pressure of the second solenoid valve S2, a second port 92 receiving hydraulic pressure from the manual valve 24, and a third port 94 for supplying the hydraulic pressure supplied to the second port 92 to the second fail-safe valve 30.

A valve spool in the valve body of the N-R control valve 22 includes a first land 96 on which the hydraulic pressure supplied through the first port 90 acts, and a second land 98 for selectively communicating the second and third ports 92 and 94. Interposed between the second land 98 and one end of the valve body is an elastic member 100. The elastic member 100 exerts constant force on the valve spool in a rightward direction (in the drawing).

Formed on a valve body of the switch valve 26 are a first port 102 receiving forward driving pressure from the manual valve 24, and second and third ports 104 and 106 receiving part of the pressure supplied to the third friction element C3 and supplying this hydraulic pressure to the pressure regulator valve 8.

A valve spool in the valve body of the switch valve 26 includes a first land 108 on which the hydraulic pressure supplied through the first port 90 acts; a second land 110 formed on an end of the valve spool opposite that on which the first land 108 is formed, the second land 110 selectively communicating the second and third ports 104 and 106; and a third land 112 formed between the first and second lands 108 and 110 and which selectively communicates the third port 106 with an exhaust port EX. Accordingly, a part of the hydraulic pressure supplied to the third friction element C3 in the third and fourth speeds of the drive D range is supplied to the pressure regulator valve 8, thereby enabling control of line pressure.

Formed on a valve body of the first fail-safe valve 28 are a first port 114 receiving hydraulic pressure from the manual valve 24, a second port 116 receiving hydraulic pressure from the second pressure control valve 18, a third port 118 receiving hydraulic pressure from the third pressure control valve 20, a fourth port 120 receiving hydraulic pressure from the first pressure control valve 16, a fifth port receiving hydraulic pressure from the N-R control valve 22, and a sixth port 124 supplying the hydraulic pressure supplied to the second port 116 to the second friction element C2.

A valve spool in the valve body of the first fail-safe valve 28 includes a first land 126 on which the hydraulic pressure supplied through the fourth port 120 acts; a second land 128 on which the hydraulic pressure supplied through the fifth port 122 acts; a third land 130 on which the hydraulic pressure supplied through the third port 118 acts; fourth and fifth lands 132 and 134 selectively communicating the second and sixth ports 116 and 124, and communicating the sixth port 124 selectively to an exhaust port EX; and a sixth land 136 on which the hydraulic pressure supplied through the first port 114 acts.

The first fail-safe valve 28 structured as in the above supplies hydraulic pressure to the second friction element C2 in the second and fourth speeds of the drive D range. Further, in the case where the third speed of the drive D range is being held as a result of the TCU malfunctioning, the first fail-safe valve 28 exhausts the hydraulic pressure supplied to the second friction element C2, thereby providing greater driving stability.

Formed on a valve body of the second fail-safe valve 30 are a first port 138 receiving control pressure from the low control valve 32 in the low L range, a second port 140 receiving hydraulic pressure from the N-R control valve 22 in the reverse R range, a third port 142 supplying the hydraulic pressure supplied to the second port 140 to the fourth friction element C4, a fourth port receiving hydraulic pressure from the third pressure control valve 20, a fifth port 146 supplying the hydraulic pressure supplied to the fourth port 144 to the third friction element C3, and a sixth port 148 receiving hydraulic pressure from the second pressure control valve 18.

A valve spool in the valve body of the second fail-safe valve 30 includes a first land 150 on which the hydraulic pressure supplied through the first port 138 acts to selectively open and close the second port 140, a second land 152 for selectively communicating the fourth port 144 with the third and fifth ports 142 and 146, and a third land 154 for selectively communicating the fifth port 146 with an exhaust port EX. An elastic member 156 is interposed between the valve body and the third land 154.

The second fail-safe valve 30 structured as in the above supplies hydraulic pressure of the third pressure control valve 20 to the third friction element C3 in the third and fourth speeds of the drive D range, and to the fourth friction element C4 while in the low L range. Further, in the reverse R range, the second fail-safe valve 30 supplies the hydraulic pressure received from the N-R control valve 22 to the fourth friction element C4.

Formed on a valve body of the low control valve 32 are a first port 158 receiving hydraulic pressure from the manual valve 24, a second port 160 supplying the hydraulic pressure supplied to the first port 158 to the second failsafe valve 30, and a third port 162 receiving hydraulic pressure from the fifth port 146 of the second fail-safe valve 30.

A valve spool in the valve body of the low control valve 32 includes a first land 164 on which the hydraulic pressure supplied to the third port 162 acts to selectively open and close the first port 158, and a second land 166 for selectively communicating the second port 160 with an exhaust port EX. An elastic member 168 is interposed between the valve body and the second land 166. The low control valve 32 structured as in the above relays low L pressure supplied from the manual valve 24 in the low L range, thereby controlling the second fail-safe valve 30.

Reference numeral S4 in the drawings refers to a fourth solenoid valve. The fourth solenoid valve S4 controls the damper clutch control valve 12 such that the damper clutch is controlled to engaged and disengaged states.

Hydraulic pressure flow in the hydraulic control system of the present invention structured as in the above will be described hereinafter.

In the neutral N range, with reference to FIG. 1, hydraulic pressure generated by the oil pump 4 is controlled to a predetermined pressure level by the pressure regulator valve 8. The hydraulic pressure then passes through the reducing valve 14 where the pressure is reduced to a predetermined level, after which the hydraulic pressure is supplied to the damper clutch control valve 12 and the first, second and third pressure control valves 16, 18 and 20. At this time, the first, second and third solenoid valves S1, S2 and S3 are maintained in OFF states by the TCU.

Figure 4:
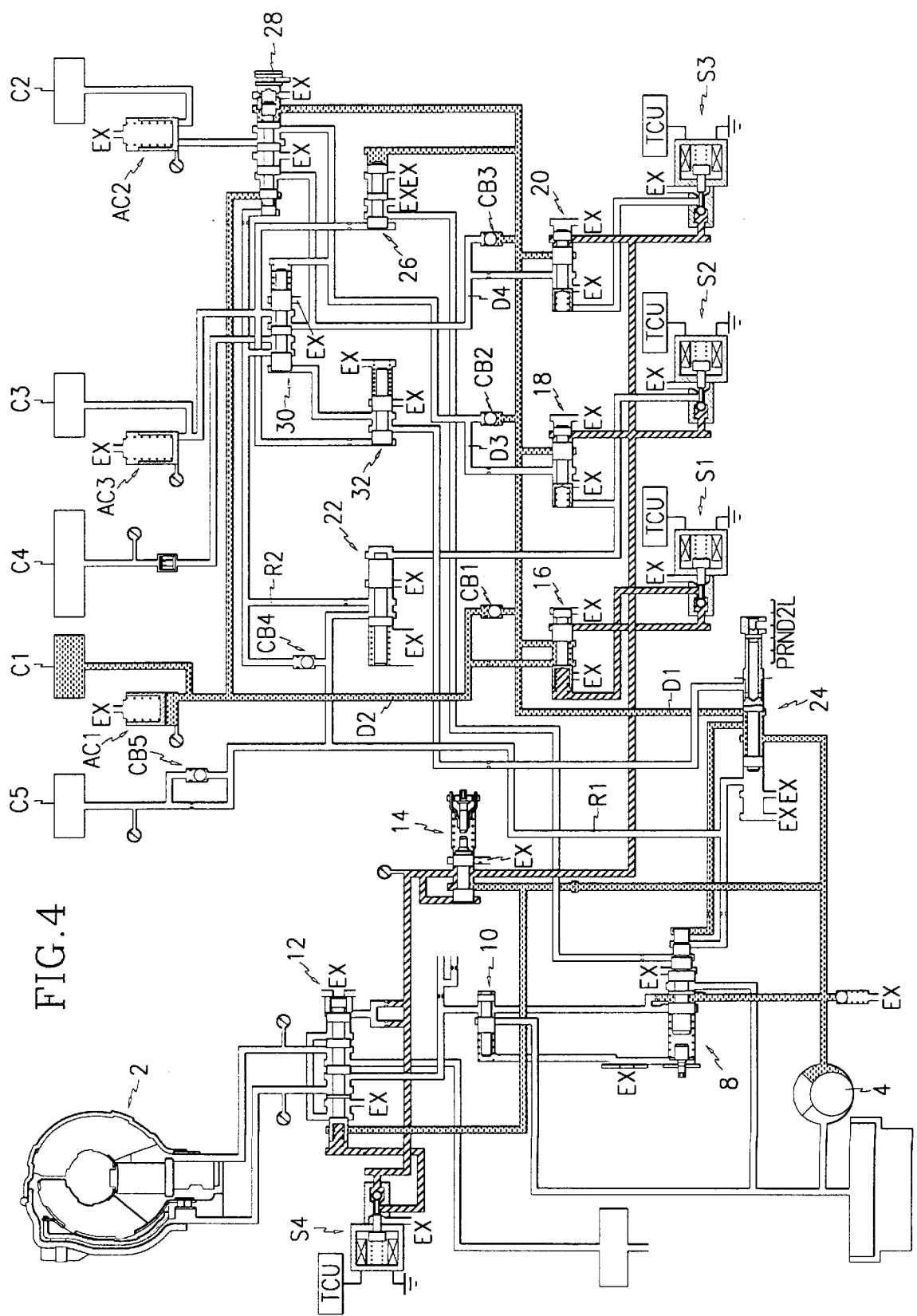
FIG. 4 shows hydraulic flow in a first speed of a drive D range in the hydraulic control system of FIG. 1.

In the first speed of the drive D range, as shown in FIG. 4, the hydraulic pressure supplied to the manual valve 24 passes through the first line D1 and is supplied to the first, second and third pressure control valves 16, 18 and 20. At this time, the first solenoid valve S1 is controlled to OFF, while the second and third solenoid valves S2 and S3 are controlled to ON.

As a result of the ON control of the second and third solenoid valves S2 and S3, the valve spools of the second and third control valves 18 and 20 move in a rightward direction (in the drawing) such that the hydraulic pressure supplied to the second and third control valves 18 and 20 is prevented from entering the second and third control valves 18 and 20, but is placed on stand-by at the second and third control valves 18 and 20. Also, the hydraulic pressure supplied to the first pressure control valve 16 moves the valve spool of the first pressure control valve 16 in a rightward direction (in the drawing) such that the hydraulic pressure is supplied to the first friction element C1, thereby realizing shifting into the first speed of the drive D range.

While in the first speed of the drive D range, if vehicle speed and throttle valve opening are increased, shifting is performed into the second speed of the drive D range. That is, in a state where the first solenoid valve is maintained in an OFF state, the TCU duty control the second solenoid valve S2 such that the control pressure of the second pressure control valve 18 is supplied to the second friction element C2 via the first fail-safe valve 28.

Figure 5:
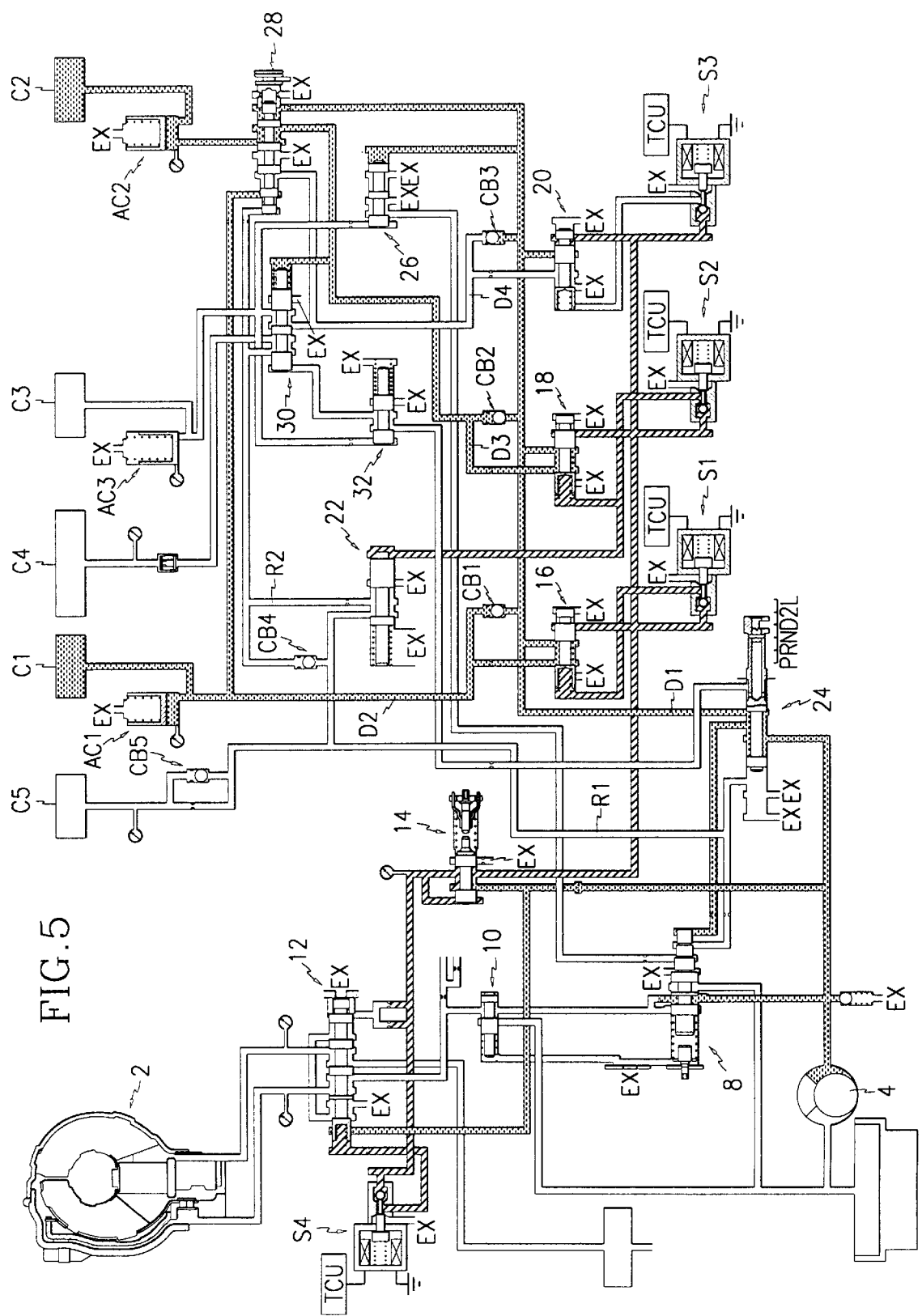
FIG. 5 shows hydraulic flow in a second speed of the drive D range in the hydraulic control system of FIG. 1.

As a result of the above, the second friction element C2 is slowly operated, thereby realizing shifting into the second speed of the drive D range. At an end of the shifting process into the second speed of the drive D range, the second solenoid valve S2 is controlled to OFF such that line pressure is fully supplied to the second friction element C2. Accordingly, hydraulic flow is realized as shown in FIG. 5 and shifting into the second speed of the drive D range is completed.

If vehicle speed and throttle valve opening are again increased in the second speed of the drive D range, the TCU duty controls the second solenoid valve S2 to discontinue the supply of operational pressure, while duty controlling the third solenoid valve S3 for the supply of operational pressure. This duty control by the TCU is performed in a state where the first solenoid valve S1 is maintained in an OFF state.

Figure 6:
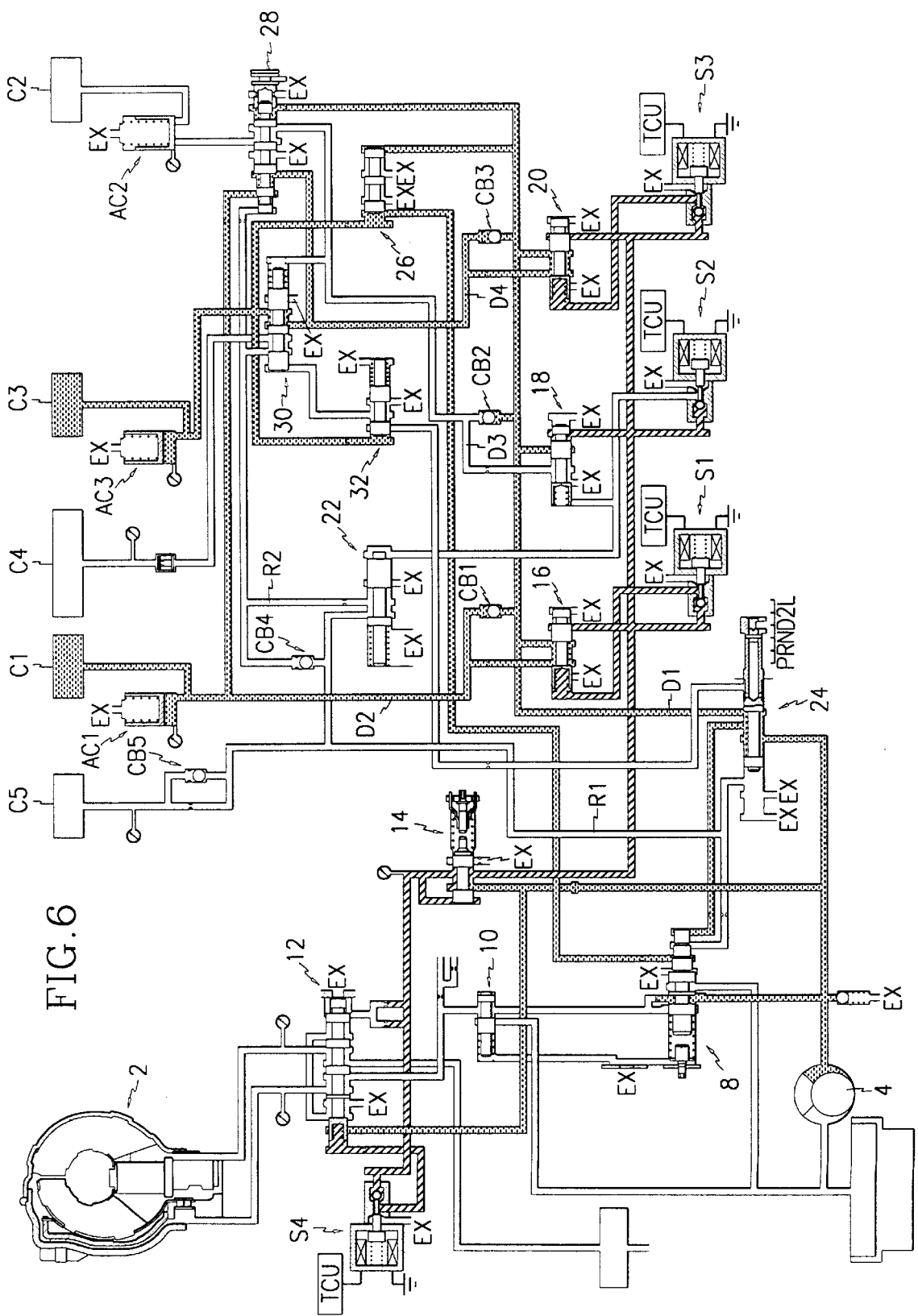
FIG. 6 shows hydraulic flow in a third speed of the drive D range in the hydraulic control system of FIG. 1.

Accordingly, supply of the hydraulic pressure supplied to the second friction element C2 is slowly discontinued by release duty control of the second solenoid valve S2, and the control pressure of the third pressure control valve 20 is supplied to the third friction element C3 via the second fail-safe valve 30 by supply duty control of the third solenoid valve S3. At an end of this shifting process, the second solenoid valve S2 is controlled to ON, and the third solenoid valve S3 is controlled to OFF such that the control pressure supplied to the third friction element C3 is converted to line pressure and shifting into the third speed of the drive D range is completed. At this time, hydraulic flow is realized as shown in FIG. 6.

In the third speed of the drive D range, part of the line pressure supplied to the third friction element C3 is supplied to the low control valve 32 to move the valve spool of the low control valve 32 to the right (in the drawing) such that the line pressure is supplied to the pressure regulator valve 8, thereby enabling control of line pressure. That is, the line pressure is reduced at this time such that drive loss of the oil pump 4 is reduced, resulting in the reduction of fuel consumption when driving at high speeds.

In the second speed of the drive D range, if vehicle speed and throttle valve opening are further increased, the TCU duty controls the first solenoid valve S1 to discontinue the supply of operational pressure, while duty controlling the second solenoid valve S2 for the supply of operational pressure. This duty control by the TCU is performed in a state where the third solenoid valve S3 is maintained in an OFF state.

Figure 7:
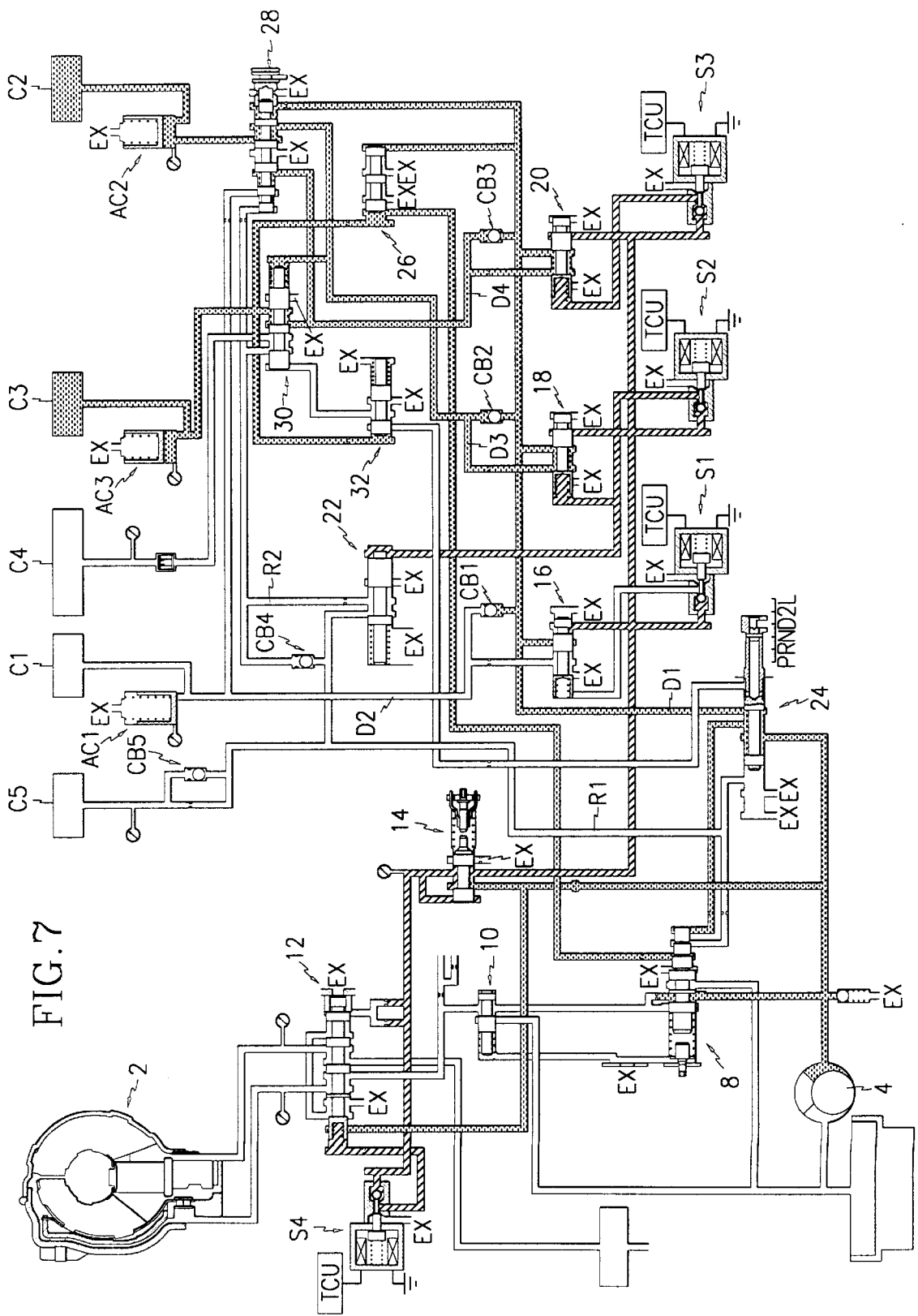
FIG. 7 shows hydraulic flow in a fourth speed of the drive D range in the hydraulic control system of FIG. 1.

Accordingly, supply of the hydraulic pressure supplied to the first friction element C1 is slowly discontinued by release duty control of the first solenoid valve S1, and the control pressure of the first pressure control valve 16 is supplied to the second friction element C2 via the first fail-safe valve 28 by supply duty control of the second solenoid valve S2. At an end of this shifting process, the first solenoid valve S1 is controlled to ON, and the second solenoid valve S2 is controlled to OFF such that the control pressure supplied to the second friction element C2 is converted to line pressure and shifting into the fourth speed of the drive D range is completed. At this time, hydraulic flow is realized as shown in FIG. 7.

Figure 8:
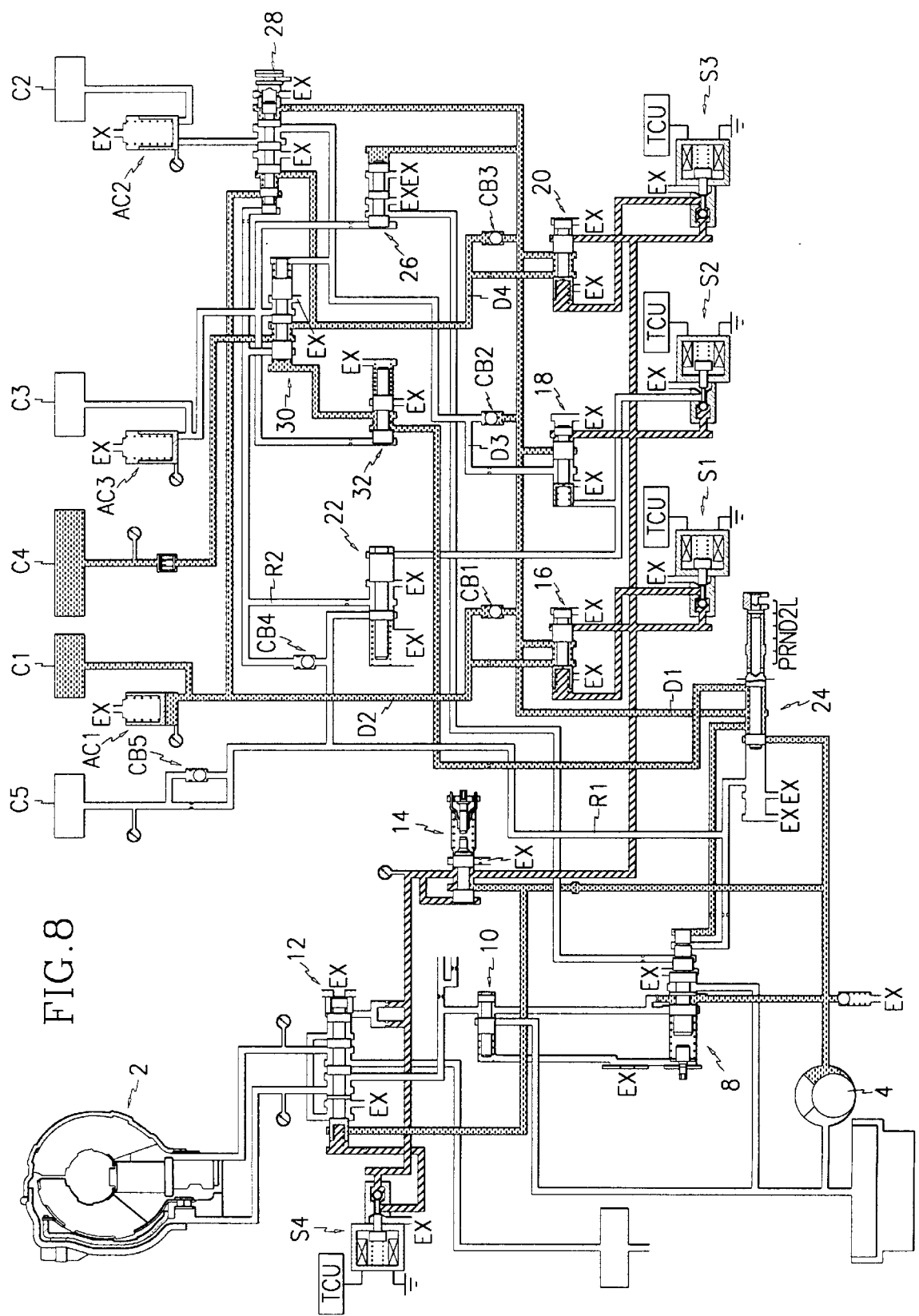
FIG. 8 shows hydraulic flow in a fourth speed of the drive D range in the hydraulic control system of FIG. 1.

Referring to FIG. 8, in the low L range, the TCU controls the first and third solenoid valves S1 and S3 to OFF and the second solenoid valve S2 to ON. As a result, low L pressure is supplied from the manual valve 24 to the second fail-safe valve 30 through the low control valve 32 such that the valve spool of the second fail-safe valve 30 is moved to the right (in the drawing). Accordingly, the pressure of the third pressure control valve 20 is supplied to the fourth friction element C4, and the pressure of the first pressure control valve 16 is supplied to the first friction element C1, thereby completing shifting.

Figure 9:
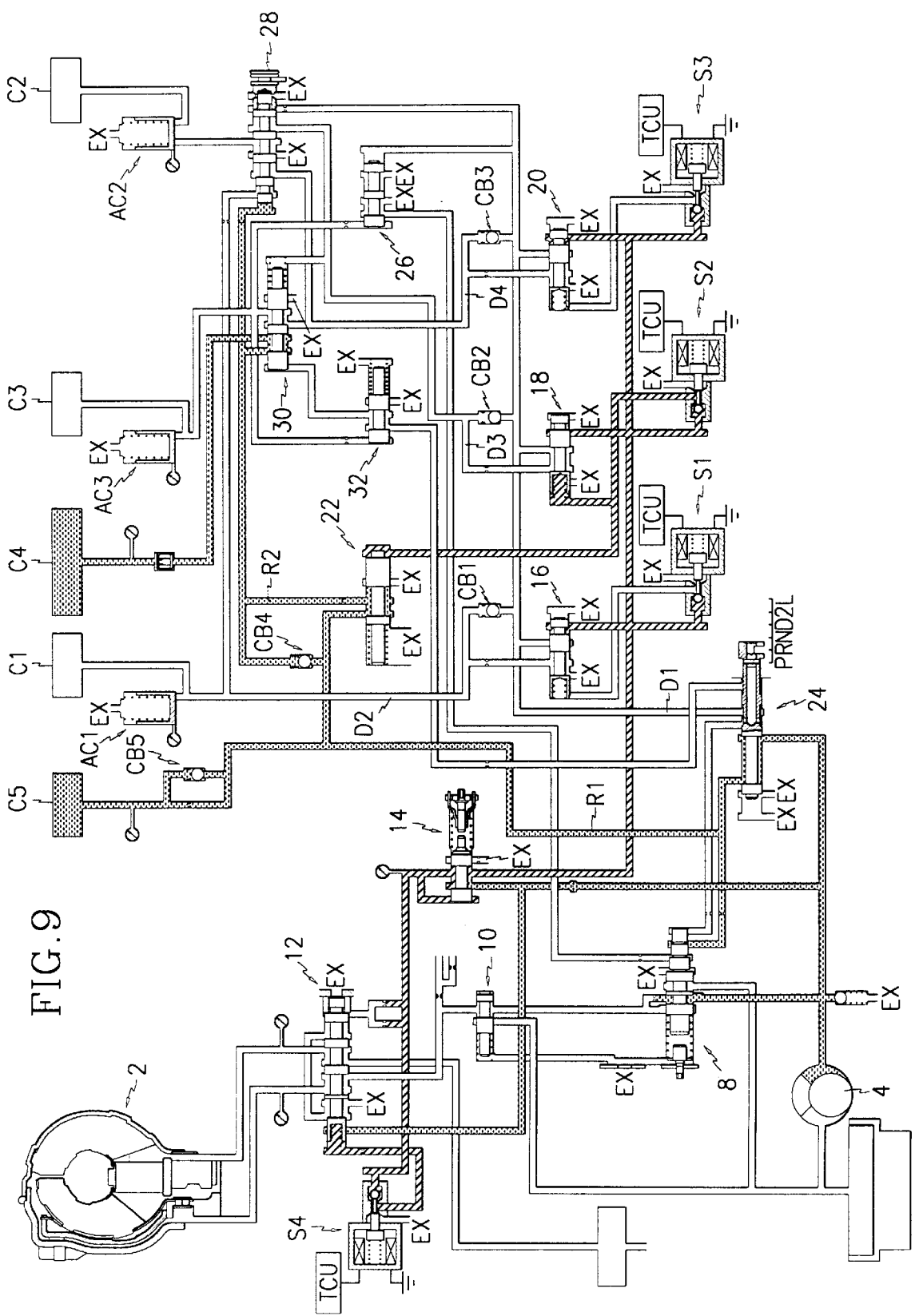
FIG. 9 shows hydraulic flow in a reverse R range in the hydraulic control system of FIG. 1

As shown in FIG. 9, reverse pressure from the manual valve 24 is supplied to the fifth friction element C5 and the N-R control valve 22. At this time, the valve spool of the N-R control valve 22 is moved to the left (in the drawing) by the OFF control of the second solenoid valve S2 such that the hydraulic pressure from the manual valve 24 passes through the first fail-safe valve 30, the valve spool of which is moved to the left (in the drawing) by the elastic force of the elastic member 156, and is supplied to the fourth friction element C4. This results in completing shifting into the reverse R range.

Figure 10:
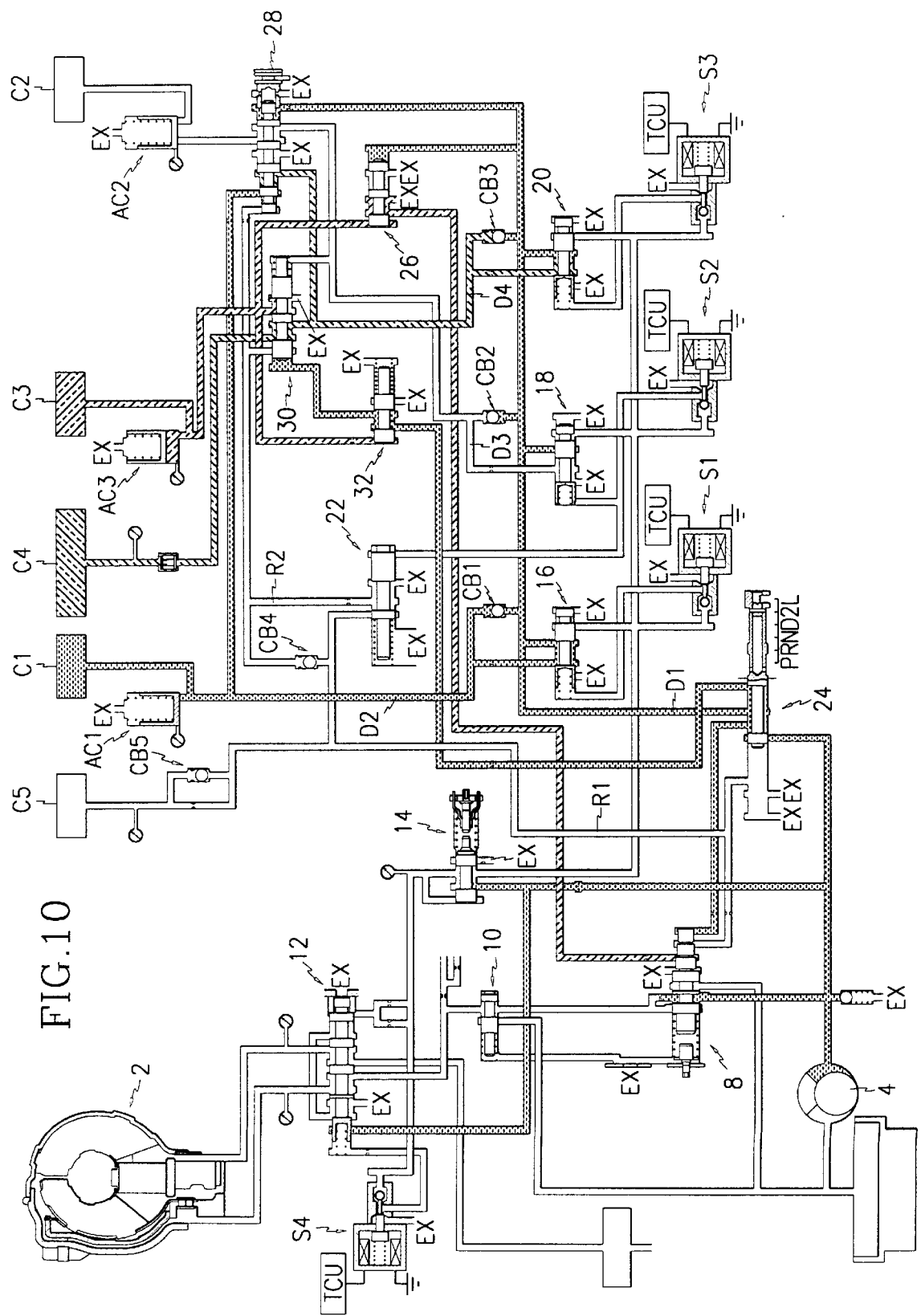
FIG. 10 shows hydraulic flow when manually shifting from a third speed of the drive D range to a low L range in the hydraulic control system of FIG. 1.

FIG. 10 shows hydraulic flow when manually shifting from a third speed of the drive D range to the low L range in the hydraulic control system of the present invention. If the user controls the shift select lever to the low L range when in the third speed of the drive D range, where the first and third friction elements C1 and C3 are operating as described above, low L pressure is supplied to the low control valve 32 from the manual valve 24, and the third solenoid valve S3 is duty controlled by the TCU for the supply of hydraulic pressure to the third solenoid valve S3.

As a result of the above, although the low L pressure is supplied to the low control valve 32, since the valve spool of the low control valve 32 is moved to the right (in the drawing) by the hydraulic pressure supplied to the third friction element C3, the low L pressure is temporarily placed on stand-by before full supply to the low control valve 32. In this state, operational pressure supplied to the third friction element C3 is decreased by the duty control of the third solenoid valve S3 such that the valve spool of the low control valve 32 is moved to the left (in the drawing) by the elastic force of the elastic member 168. Accordingly, the first and second ports 158 and 160 are communicated so that the low L pressure on stand-by at the first port 158 is supplied to the first port 120 of the second fail-safe valve 28 to move the valve spool of the second failsafe valve 28 to the right (in the drawing).

As a result of the above, the fifth port 146 of the second fail-safe valve 30 is communicated with the exhaust port EX, resulting in the exhaust of the hydraulic pressure supplied to the third friction element C3. Also, the fourth port 142 is communicated with the third port 140 so that the control pressure of the third pressure control valve 20 is supplied to the fourth friction element C4, thereby realizing manual shifting into the low L range from the third speed of the drive D range.

When manually shifting from the third speed of the drive D range to the low L range, the low L pressure of the manual valve 24 is not directly supplied to the second fail-safe valve 30, but rather temporarily remains on stand-by at the low control valve 32 while the hydraulic pressure supplied to the third friction element C3 is supplied to the second fail-safe valve 32 and the operational pressure of the third friction element C3 is exhausted, after which operational pressure is supplied to the fourth friction element C4. Accordingly, engine overrun is minimized.

Figure 11:
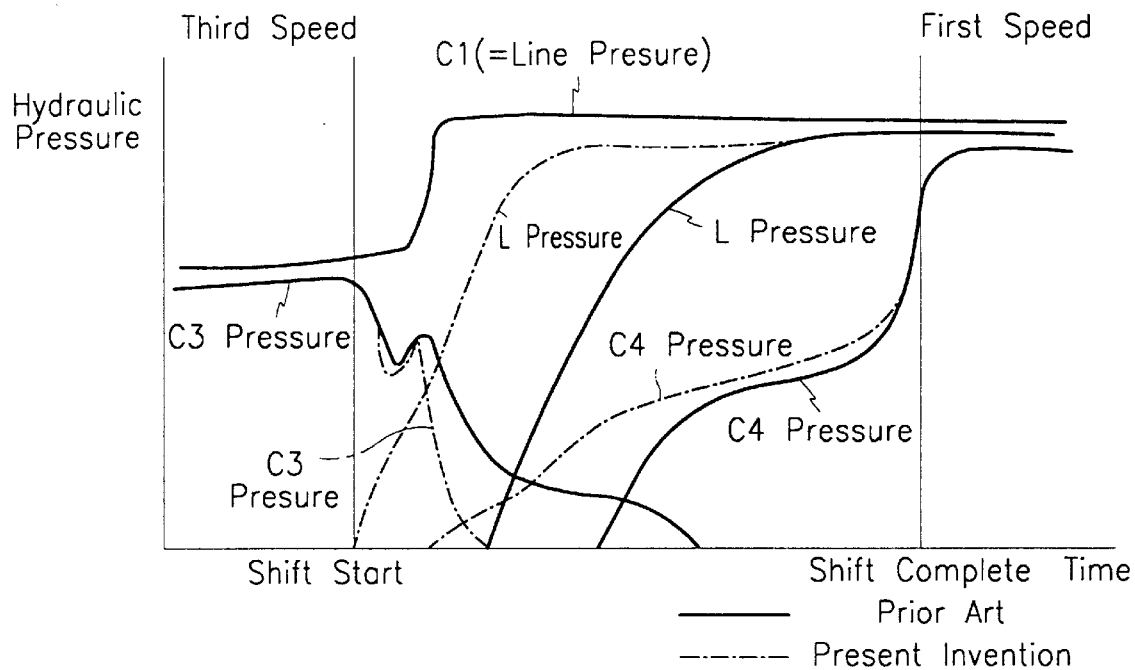
FIG. 11 is a graph showing a relation between hydraulic pressure levels and time when shifting from the third speed of the drive D range to the low L range in the hydraulic control system of the present invention shown in FIG. 1 and in the prior art.
Figure 12:
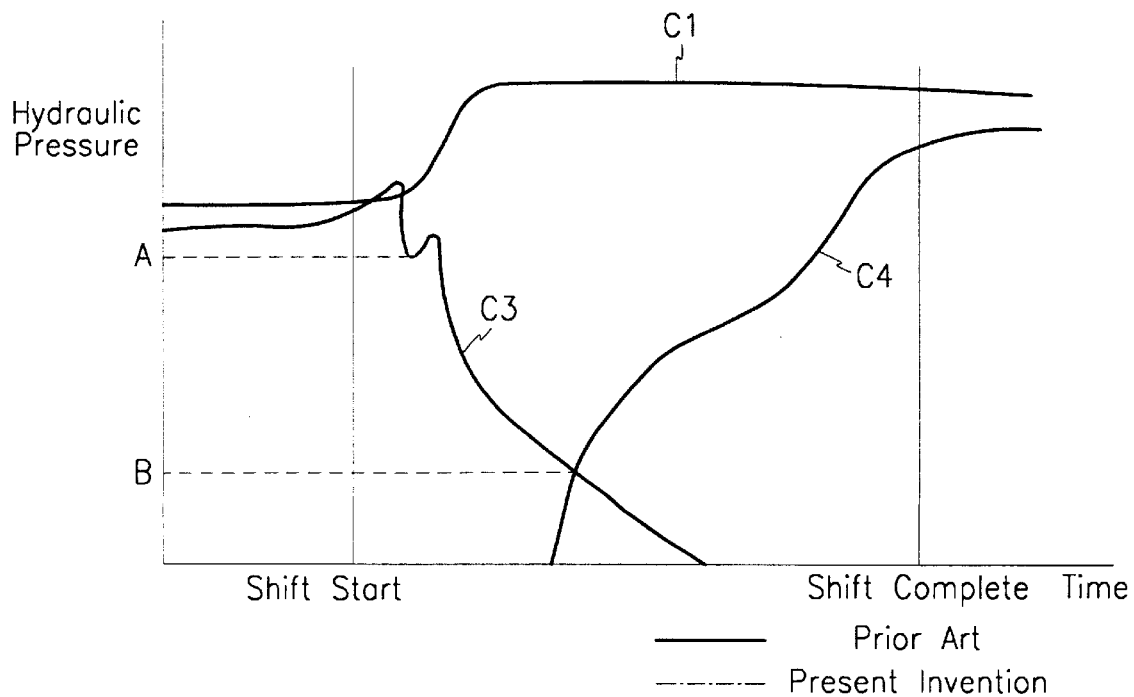
FIG. 12 is a graph showing a relation between hydraulic pressure levels and time when shifting from the low L range to the third speed of the drive D range in the hydraulic control system of FIG. 1.

That is, with reference to FIG. 11, at the beginning of shifting in the prior art hydraulic control system, low L pressure abruptly increases and operational pressure of a third friction element C3 begins to be discontinued. As a result, operational pressure is supplied to a fourth friction element C4. Accordingly, problems resulting from three friction elements simultaneously operating result.

On the other hand, in the hydraulic control system of the present invention, the operational pressure of the first friction element C1 is increased while the pressure of the third friction element C3 is discontinued, and after the pressure of the third friction element C3 falls below a predetermined level, operational pressure is supplied to the fourth friction element C4 as the low L pressure of the manual valve 24 is supplied to the second fail-safe valve 30. Therefore, problems related to too many friction elements operating at one time are avoided.

To enable the above, it is preferable that a reference operational pressure of the switch valve 26 is set at 0.8 kg/cm$^2$, and a reference operational pressure of the low control valve 32 is set at 0.3 kg/cm$^2$. That is, if the pressure supplied to the third friction element C3 is reduced to 0.8 kg/cm$^2$ by duty control of the third solenoid valve S3, the valve spool of the low control valve 32 moves to the left (in the drawings) and line pressure control is discontinued, thereby resulting in a high level of line pressure. Further, if the release pressure of the third friction element C3 reduced further to a level below 0.3 kg/cm$^2$, the valve spool of the low control valve 32 moves to the left (in the drawings) by the elastic force of its elastic member 168 such that the low L pressure acts on the second fail-safe valve 30 and the pressure supplied to the third friction element C3 is controlled to the fourth friction element C4, resulting in shifting into the low L range.

The reference operational pressures above are determined according to surface areas of lands and elastic forces of the elastic members.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system used in automatic transmissions comprising:

a pressure regulator for controlling hydraulic pressure generated by an oil pump, the pressure regulator comprising a pressure regulator valve;

a pressure reducer for maintaining pressure at a level lower than line pressure, the presure reducer comprising a reducing valve;

a damper clutch controller for operating a damper clutch of a torque converter;

a shift controller for forming shift modes, the shift controller comprising a manual valve indexed with a select lever operated by a user;

a hydraulic pressure controller for providing shift quality and shift responsiveness to enable smooth shifting; and a hydraulic pressure distributor for supplying suitable hydraulic pressures to first, second, third, fourth and fifth friction elements operating as input and reaction elements in each shift stage, the hydraulic pressure distributor comprising a plurality of spool valves, wherein the hydraulic pressure controller comprises a first pressure control valve for controlling the hydraulic pressure supplied to the first friction element, a second pressure control valve for controlling the hydraulic pressure supplied to the second friction element, a third pressure control valve for controlling the hydraulic pressure supplied to the third friction element, and an N-R control valve which controls reverse pressure supplied to the fourth friction element;

the hydraulic pressure distributor comprises: (a) a switch valve supplying a part of operational pressure of a third operational element to the pressure regulator valve for line pressure control, the third operational element operating in a third and fourth speed of a drive D range while being controlled by forward pressure supplied from the manual valve; (b) a first fail-safe valve controlled by part of the hydraulic pressure supplied to the first, third and fifth friction elements and control pressure supplied from the manual valve in the drive D range, and which supplies hydraulic pressure the second friction elements in a second and fourth speed of the drive D range or exhausts the hydraulic pressure supplied to the second friction element when a transmission control unit is malfunctioning; and (c) a second fail-safe valve controlled by control pressure supplied from the second pressure control valve and hydraulic pressure supplied from the manual valve via a low control valve in a low L range, and which supplies hydraulic pressure supplied to the third pressure control valve means to the third friction element in the third and fourth speeds of the drive D range and to the fourth friction element in the low L range, and supplies reverse pressure supplied through a reverse pressure line to the fourth friction element in a reverse R range;

wherein the low control valve controls by the hydraulic pressure supplied to the third friction element, and controls the hydraulic pressure supplied to the second fail-safe valve from the manual valve in the low L range.

2. The hydraulic control system of claim 1 wherein the manual valve of the shift controller forms passages for control of line pressure and supply of hydraulic pressure to the fourth and fifth friction elements in the reverse R range, supply of hydraulic pressure to the hydraulic pressure controller and the hydraulic pressure distributor in the drive D range, supply of control pressure to the second fail-safe valve via the low control valve of the hydraulic pressure distributor in the low L range.

3. The hydraulic control system of claim 1 wherein the first pressure control valve is provided with a first solenoid valve for controlling the hydraulic pressure supplied to the first friction element in a first and the second and third speeds of the drive D range; the second pressure control valve is provided with a second solenoid valve for supplying hydraulic pressure to the second friction element in the second and fourth speeds of the drive D range; and the third pressure control valve is provided with a third solenoid valve for supplying hydraulic pressure to the third friction element in the third and fourth speeds of the drive D range.

4. The hydraulic control system of claim 1 wherein the hydraulic pressure controlled in the first pressure control valve is supplied to the first friction element which operates in first, second and third speeds of the drive D range, and to the first fail-safe valve as control pressure.

5. The hydraulic control system of claim 1 wherein the hydraulic pressure controlled in the second pressure control valve is supplied as control pressure to the second fail-safe valve, and via the first fail-safe valve to the second friction element which operates in the second and fourth speeds of the drive D range.

6. The hydraulic control system of claim 1 wherein the hydraulic pressure controlled in the third pressure control valve is supplied as control pressure to the first fail-safe valve, and to the third friction element via the second fail-safe valve in the third and fourth speeds of the drive D range.

7. The hydraulic control system of claim 1 wherein the N-R control valve of the hydraulic pressure controller is controlled by hydraulic pressure supplied from the second pressure control valve in the reverse R range, and which receives part of the hydraulic pressure supplied from the manual valve to the fifth friction element via a first reverse pressure line and supplied the hydraulic pressure to the fourth friction element and the first fail-safe valve via a second reverse pressure line and the second fail-safe valve.

8. The hydraulic control system of claim 1 wherein check valves are disposed between lines supplying hydraulic pressure to the first, second and third pressure control valves and the N-R control valve and lines supplying pressure controlled in the first, second and third pressure control valves and the N-R control valve to other elements of the hydraulic control system, the check valves acting to prevent reverse flow of hydraulic pressure.

9. The hydraulic control system of claim 1 wherein lines are formed to allow the hydraulic pressure supplied to the third friction element to be supplied to the pressure regulator valve via the switch valve, and as control pressure to the low control valve.

10. The hydraulic control system of claim 3 wherein a valve body of the first pressure control valve includes a first port receiving reduced hydraulic pressure from the reducing valve; a second port receiving hydraulic pressure from the manual valve; a third port for supplying the hydraulic pressure supplied to the second port to an underdrive clutch of the first friction element; and a fourth port receiving control pressure from the first solenoid valve, a valve spool in the valve body of the first pressure control valve includes a first land having a diameter for selectively exhausting the hydraulic pressure supplied to the first port through an exhaust port; a second land on which the hydraulic pressure supplied to the first port acts to selectively open/close the second port; and a third land for selectively communicating the second and third ports together with the second land, and an elastic member is interposed between the third land and one end of the valve body.

11. The hydraulic control system of claim 3 wherein a valve body of the second pressure control valve includes a first port receiving reduced hydraulic pressure from the reducing valve, a second port receiving hydraulic pressure from the manual valve, a third port for supplying the hydraulic pressure supplied to the second port to the first and second fail-safe valves, and a fourth port receiving control pressure from the second solenoid valve, a valve spool in the valve body of the second pressure control valve includes a first land having a diameter for selectively exhausting the hydraulic pressure supplied to the first port through an exhaust port, a second land on which the hydraulic pressure supplied to the first port acts to selectively open/close the second port, and a third land for selectively communicating the second and third ports together with the second land, and an elastic member is interposed between the third land and one end of the valve body.

12. The hydraulic control system of claim 3 wherein a valve body of the third pressure control valve includes a first port receiving reduced hydraulic pressure from the reducing valve, a second port receiving hydraulic pressure from the manual valve, a third port for supplying the hydraulic pressure supplied to the second port to the first and second fail-safe valves, and a fourth port receiving control pressure from the third solenoid valve, a valve spool in the valve body of the third pressure control valve includes a first land having a diameter for selectively exhausting the hydraulic pressure supplied to the first port through an exhaust port, a second land on which the hydraulic pressure supplied to the first port acts to selectively open/close the second port, and a third land for selectively communicating the second and third ports with the second land, and an elastic member is interposed between the third land and one end of the valve body.

13. The hydraulic control system of claim 3 wherein a valve body of the N-R control valve, controlled by control pressure of the second solenoid valve, includes a first port receiving control pressure of the second solenoid valve, a second port receiving hydraulic pressure from the manual valve, and a third port for supplying the hydraulic pressure supplied to the second port to the second fail-safe valve, a valve spool in the valve body of the N-R control valve includes a first land on which the hydraulic pressure supplied through the first port acts, and a second land for selectively communicating the second and third ports, and an elastic member is interposed between the second land and one end of the valve body.

14. The hydraulic control system of claim 1 wherein a valve body of the switch valve includes a first port receiving forward driving pressure from the manual valve, and second and third ports receiving part of the pressure supplied to the third friction element and supplying this hydraulic pressure to the pressure regulator valve, and a valve spool in the valve body of the switch valve includes a first land on which the hydraulic pressure supplied through the first port acts; a second land formed on an end of the valve spool opposite that on which the first land is formed, the second land selectively communicating the second and third ports; and a third land formed between the first and second lands and which selectively communicates the third port with an exhaust port.

15. The hydraulic control system of claim 1 wherein a valve body of the first fail-safe valve includes a first port receiving hydraulic pressure from the manual valve, a second port receiving hydraulic pressure from the second pressure control valve, a third port receiving hydraulic pressure from the third pressure control valve, a fourth port receiving hydraulic pressure from the first pressure control valve, a fifth port receiving hydraulic pressure from the N-R control valve, and a sixth port supplying the hydraulic pressure supplied to the second port to the second friction element, and a valve spool in the valve body of the first fail-safe valve includes a first land on which the hydraulic pressure supplied through the fourth port acts; a second land on which the hydraulic pressure supplied through the fifth port acts; a third land on which the hydraulic pressure supplied through the third port acts; fourth and fifth lands selectively communicating the second and sixth ports, and communicating the sixth port selectively to an exhaust port; and a sixth land on which the hydraulic pressure supplied through the first port acts.

16. The hydraulic control system of claim 1 wherein a valve body of the second fail-safe valve includes are a first port receiving control pressure from the low control valve in the low L range, a second port receiving hydraulic pressure from the N-R control valve in the reverse R range, a third port supplying the hydraulic pressure supplied to the second port to the fourth friction element, a fourth port receiving hydraulic pressure from the third pressure control valve, a fifth port supplying the hydraulic pressure supplied to the fourth port to the third friction element, and a sixth port receiving hydraulic pressure from the second pressure control valve, a valve spool in the valve body of the second fail-safe valve includes a first land on which the hydraulic pressure supplied through the first port acts to selectively open and close the second port, a second land for selectively communicating the fourth port with the third and fifth ports, and a third land for selectively communicating the fifth port with an exhaust port, and an elastic member is interposed between the valve body and the third land.

17. The hydraulic control system of claim 1 wherein a valve body of the low control valve includes a first port receiving hydraulic pressure from the manual valve, a second port supplying the hydraulic pressure supplied to the first port to the second fail-safe valve, and a third port receiving hydraulic pressure from a fifth port of the second fail-safe valve, a valve spool in the valve body of the low control valve includes a first land on which the hydraulic pressure supplied to the third port acts to selectively open and close the first port, and a second land for selectively communicating the second port with an exhaust port, and an elastic member is interposed between the valve body and the second land.

18. The hydraulic control system of claim 1 wherein a reference operational pressure of the switch valve is set at 0.8 kg/cm$^2$, and a reference operational pressure of the low control valve is set at 0.3 kg/cm$^2$.

19. The hydraulic control system of claim 1 wherein, during shifting from the third speed of the drive D range, the hydraulic pressure of the first friction element is increased while the hydraulic pressure of the third friction element is discontinued, and after the hydraulic pressure of the third friction element falls below a predetermined level, operational pressure is supplied to the fourth friction element as a low L pressure of the manual valve is supplied to the second fail-safe valve.

20. The hydraulic control system of claim 1 further comprising accumulators provided on lines connected to the first, second and third friction elements, which operate in forward driving modes, the accumulators storing fluid during the supply of hydraulic pressure such that hydraulic pressure flows smoothly.

* * * * *